United States Patent
Hartman

(10) Patent No.: US 9,093,846 B2
(45) Date of Patent: Jul. 28, 2015

(54) METHODOLOGY FOR CONTROLLING A SWITCHING REGULATOR BASED ON HARDWARE PERFORMANCE MONITORING

(71) Applicant: National Semiconductor Corporation, Santa Clara, CA (US)

(72) Inventor: Mark Hartman, Santa Clara, CA (US)

(73) Assignee: NATIONAL SEMICONDUCTOR CORPORATION, Santa Clara, CA (US)

(*) Notice: Subject to any disclaimer, the term of this patent is extended or adjusted under 35 U.S.C. 154(b) by 0 days.

(21) Appl. No.: 13/779,417

(22) Filed: Feb. 27, 2013

(65) Prior Publication Data

US 2013/0169262 A1    Jul. 4, 2013

Related U.S. Application Data

(62) Division of application No. 12/592,881, filed on Dec. 4, 2009, now abandoned.

(51) Int. Cl.
*G05F 1/00* (2006.01)
*H02J 1/00* (2006.01)
*H02M 3/158* (2006.01)

(52) U.S. Cl.
CPC .............. *H02J 1/00* (2013.01); *H02M 3/1584* (2013.01)

(58) Field of Classification Search
USPC .......... 323/282, 283, 318, 322; 713/300, 310, 713/320
See application file for complete search history.

(56) References Cited

U.S. PATENT DOCUMENTS

| | | | |
|---|---|---|---|
| 6,157,247 | A | 12/2000 | Abdesselem et al. |
| 6,208,127 | B1 | 3/2001 | Doluca |
| 6,535,735 | B2 | 3/2003 | Underbrink et al. |
| 6,548,991 | B1 | 4/2003 | Maksimovic et al. |
| 6,868,503 | B1 | 3/2005 | Maksimovic et al. |
| 6,870,410 | B1 | 3/2005 | Doyle et al. |

(Continued)

FOREIGN PATENT DOCUMENTS

WO    WO 2009010920 A2 *   1/2009

OTHER PUBLICATIONS

"Intel Pentium 4 Processor VR-Down Design Guidelines," Intel, Nov. 2002, 16 pages.

(Continued)

*Primary Examiner* — Nguyen Tran
(74) *Attorney, Agent, or Firm* — Andrew Viger; Frank D. Cimino

(57) ABSTRACT

A methodology for regulating power supplied to a powered component based on hardware performance, such as may be used in a system that includes the powered component and a switching regulator (EMU or energy management unit) configured to supply a regulated supply voltage to the powered component. Performance monitoring circuitry generates a performance monitoring signal corresponding to a detected performance level of selected digital operations of the powered component relative to a reference performance level. Switching control circuitry provides a switching control signal in response to the performance monitoring signal. In an example embodiments, the switching control circuitry for the switching regulator (switching transistor) is integrated into the powered component, and the detected performance level corresponds to a detected signal path delay associated with the digital operations of the powered component.

17 Claims, 3 Drawing Sheets

(56) References Cited

U.S. PATENT DOCUMENTS

| | | |
|---|---|---|
| 6,944,780 B1 | 9/2005 | Kranzen et al. |
| 6,985,025 B1 | 1/2006 | Maksimovic et al. |
| 6,996,730 B2 | 2/2006 | Bonnett |
| 7,002,325 B2 | 2/2006 | Harris et al. |
| 7,024,568 B2 | 4/2006 | Maksimovic et al. |
| 7,075,276 B2 | 7/2006 | Morales |
| 7,106,040 B1 | 9/2006 | Maksimovic et al. |
| 7,117,378 B1 | 10/2006 | Maksimovic et al. |
| 7,122,996 B1 | 10/2006 | Huang |
| 7,268,526 B1 | 9/2007 | Smith |
| 7,276,925 B2 | 10/2007 | Dobberpuhl et al. |
| 7,289,921 B1 | 10/2007 | Salmi et al. |
| 7,479,768 B1 | 1/2009 | Salmi |
| 7,493,149 B1 | 2/2009 | Doyle et al. |
| 7,518,350 B2 | 4/2009 | Leung |
| 7,581,120 B1 | 8/2009 | Hartman et al. |
| 7,581,131 B1 | 8/2009 | Prasad et al. |
| 7,602,166 B1 | 10/2009 | Kang |
| 7,685,441 B2 * | 3/2010 | Burton et al. ............... 713/300 |
| 7,788,508 B1 | 8/2010 | Salmi et al. |
| 7,921,312 B1 | 4/2011 | Pennanen et al. |
| 8,010,317 B1 | 8/2011 | Pennanen et al. |
| 8,077,490 B1 | 12/2011 | Prodic et al. |
| 8,151,125 B1 | 4/2012 | Hartman et al. |
| 2005/0039059 A1* | 2/2005 | Park .............................. 713/300 |
| 2007/0085521 A1* | 4/2007 | Nagai ........................... 323/283 |
| 2007/0260898 A1* | 11/2007 | Burton et al. ................. 713/300 |
| 2008/0303501 A1 | 12/2008 | Prodic |
| 2010/0141230 A1* | 6/2010 | Lukic et al. ................... 323/283 |

OTHER PUBLICATIONS

"6-Bit Programmable 2-/3-Phase Synchronous Buck Controller, ADP3197," Analog Devices, 2007, 32 pages.

"8-Bit Programmable 2-to 4-Phase Synchronous Buck Controller, ADP3192," Analog Devices, 2006, 32 pages.

"PowerWise AVS Energy Management Unit With SPMI," National Semiconductor Corporation, Mar. 5, 2009, 44 pages.

U.S. Appl. No. 12/653,416, filed Dec. 14, 2009, "Adaptive Voltage-Scaling (AVS) Control System For Multiple Voltage Domains," Juha Pennanen, 40 pages.

"Voltage Regulator Module (VRM) and Enterprise Voltage Regulator-Down (EVRD) 11.1," Design Guidelines, Intel, Sep. 2009, 62 pages.

U.S. Appl. No. 12/587,910, filed Oct. 15, 2009, "Apparatus and Method for Isolating an Adaptive Voltage Scaling (AVS) Loop in a Powered Systems," 29 pages.

* cited by examiner

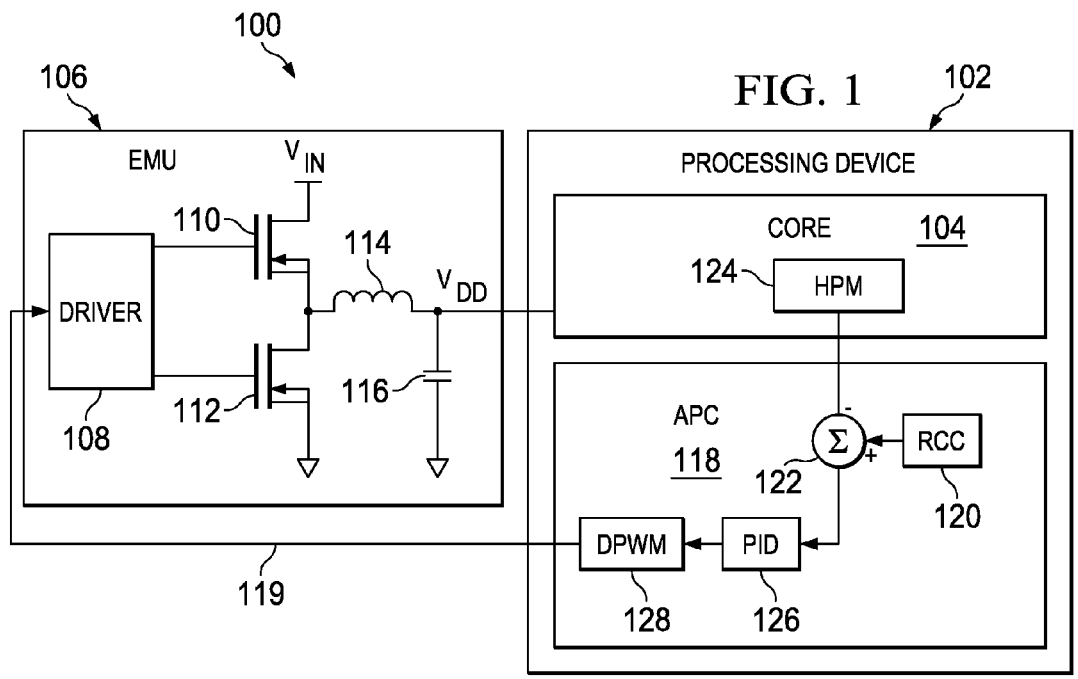
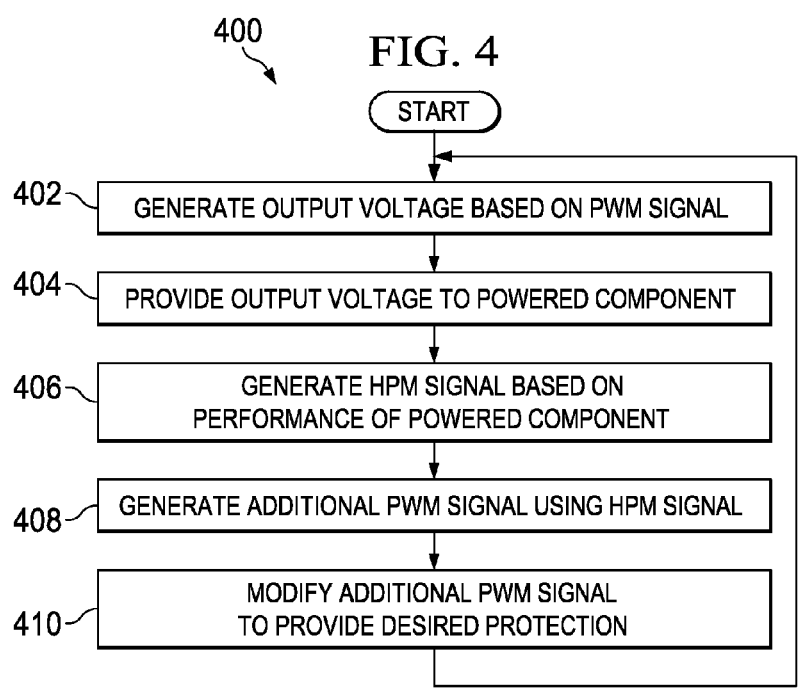

METHODOLOGY FOR CONTROLLING A SWITCHING REGULATOR BASED ON HARDWARE PERFORMANCE MONITORING

CROSS-REFERENCE TO RELATED APPLICATION

This Divisional Application under 35 USC §121 claims the benefit of the filing date of U.S. application Ser. No. 12/592,881, filed Dec. 4, 2009).

BACKGROUND

1. Technical Field

This Specification is generally directed to hardware performance monitoring systems, such as adaptive voltage scaling, in which hardware performance is used in controlling the supply of power to a component or circuitry based on performance requirements.

2. Related Art

Adaptive voltage scaling (AVS) may be used to control the supply of power to components or circuitry based on hardware performance requirements. An example AVS system may include multiple delay cells coupled in series, where the speed of the delay cells varies based on a supply voltage. A signal can be sent through the delay cells, and the supply voltage can be adjusted until the signal reaches a first one of the delay cells and not a second one of the delay cells. In this way, the AVS system can be used in controlling a supply voltage necessary to achieve a desired level of performance.

BRIEF SUMMARY

This Specification discloses and claims apparatus and methods for controlling a switched mode power supply (SMPS or switching regulator) based on hardware performance of a powered component/system.

Aspects and technical features of the claimed methodology may be used in connection with a circuit that provides a regulated supply voltage to a powered component that performs digital operations, and include: (a) supplying the regulated supply voltage to the powered component, the supply voltage being regulated in response to a switching control signal; (b) generating a performance monitoring signal corresponding to a detected performance level of selected digital operations of the powered component relative to a reference performance level; and (c) providing the switching control signal in response to the performance monitoring signal. In example embodiments, the powered component includes (a) core circuitry performing digital operations; (b) switching control circuitry generating the switching control signal in response to the performance monitoring signal; and (c) performance monitoring circuitry generating the performance monitoring signal corresponding to a detected performance level of selected digital operations of the core circuitry relative to a reference performance level. In other example embodiments, the detected performance level corresponds to a signal path delay associated with the digital operations of the powered component.

Other aspects and technical features of the disclosed invention will be apparent to those skilled in the art from the Description, Figures and Claims of this Specification.

BRIEF DESCRIPTION OF THE DRAWINGS

FIG. 1 illustrates a first example powered system having a single regulation loop adaptive voltage scaling (AVS) system according to this Specification;

FIG. 4 illustrates an example method for powering a system using a single regulation loop AVS system according to this Specification.

DETAILED DESCRIPTION

Figure 2:
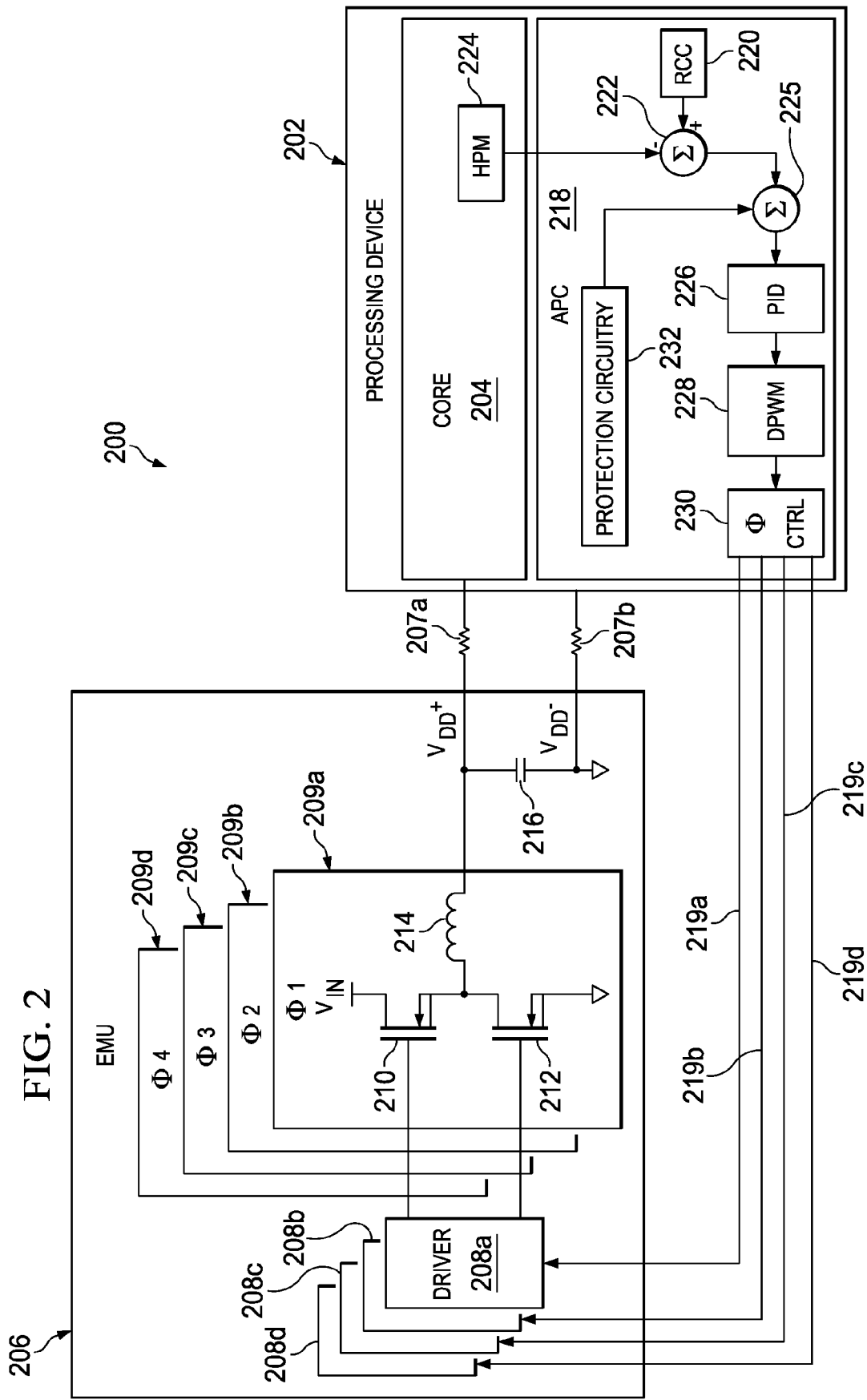
FIG. 2 illustrates a second example powered system having a single regulation loop AVS system according to this Specification.

This Description and the Figures disclose example embodiments and applications, that illustrate various aspects and technical features of the invention disclosed and claimed in this Specification. Known circuits, functions and operations are not described in detail to avoid unnecessarily obscuring the principles and features of the claimed invention.

In brief overview, this Specification discloses and claims apparatus and methods for regulating power supplied to a powered component based on hardware performance associated with the powered component, such as may be used in a system that includes the powered component; and a switching regulator (EMU or energy management unit) configured to supply a regulated supply voltage to the powered component, the supply voltage being regulated in response to a switching control signal. The system includes performance monitoring circuitry configured to generate a performance monitoring signal corresponding to a detected performance level of selected digital operations of the powered component relative to a reference performance level; and switching control circuitry configured to provide the switching control signal in response to the performance monitoring signal. In example embodiments, the powered component integrates (a) core circuitry performing digital operations; (b) performance monitoring circuitry generating a performance monitoring signal corresponding to a detected performance level of selected digital operations of the core circuitry relative to a reference performance level; and (c) switching control circuitry generating the switching control signal in response to the performance monitoring signal. In other example embodiments, the detected performance level corresponds to a signal path delay associated with the digital operations of the powered component.

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIG. 1 illustrates a first example powered system 100 having a single regulation loop adaptive voltage scaling (AVS) system according to this Specification. The embodiment of the powered system 100 shown in FIG. 1 is for illustration only. Other embodiments of the powered system 100 could be used without departing from the scope of this Specification.

As shown in FIG. 1, the system 100 includes a powered component 102 that is being supplied with operating power. The powered component 102 could represent a processing device, such as a microprocessor, microcontroller, digital signal processor, or application specific integrated circuit. Note that a processing device represents only one example type of component that could be powered in a powered system having an AVS system. Any other or additional type(s) of powered component(s) could be used in the powered system 100.

In this example, the powered component 102 includes a core 104, which generally denotes the portion of the powered component 102 responsible for performing processing operations or other core functions of the powered component 102. At least the core 104 in the powered component 102 receives a supply voltage $V_{DD}$ from an energy management unit (EMU) 106.

In the example shown in FIG. 1, the EMU 106 includes a buck converter formed by a driver 108, two transistors 110-112, an inductor 114, and a capacitor 116. The driver 108 generates control signals for gates of the transistors 110-112, allowing the driver 108 to turn the transistors 110-112 on and off. The transistor 110 selective couples an input voltage $V_{IN}$ to the inductor 114, and the transistor 112 selective couples the inductor 114 to ground. By turning the transistors 110-112 on and off, the EMU 106 can generate and adjust the supply voltage $V_{DD}$ provided to the powered component 102. The driver 108 includes any suitable structure for driving one or more transistors. Each of the transistors 110-112 includes any suitable transistor device, such as n-channel MOSFET transistors like standard driver metal oxide semiconductor (DrMOS) transistors.

The inductor 114 is coupled to the transistors 110-112 and is charged and discharged by the transistors 110-112. The inductor 114 provides the supply voltage $V_{DD}$ to the powered component 102. The inductor 114 includes any suitable inductive structure having any suitable inductance. The capacitor 116 is coupled to the inductor 114 and helps to filter the supply voltage $V_{DD}$ generated by the inductor 114. The capacitor 116 includes any suitable capacitive structure having any suitable capacitance.

As shown in FIG. 1, the powered component 102 includes an advanced power controller (APC) 118. The APC 118 performs operations to generate a pulse width modulated (PWM) signal 119 that controls the operation of the driver 108. This allows the APC 118 to control the driving of the transistors 110-112 and therefore to control the supply voltage $V_{DD}$.

In this example, the APC 118 includes a reference calibration code (RCC) table 120, which acts as a digital reference for the AVS loop. For example, the RCC table 120 could provide a reference performance code that identifies the expected performance of the powered component 102 in a given situation, such as the expected performance at a particular clock frequency. The RCC table 120 includes any suitable structure for storing and retrieving reference codes for an AVS loop. The APC 118 also includes a summer 122, which subtracts an output of a hardware performance monitor (HPM) 124 from the appropriate digital reference retrieved from the RCC table 120. The summer 122 includes any suitable structure for combining values.

The HPM 124 monitors the operation of the core 104. For example, the HPM 124 could measure the propagation delay of digital operations in the core 104, such as by using a series of delay cells. The propagation delay could vary based on a number of factors, such as process, voltage, and temperature variations. The HPM 124 outputs a performance code to the advanced power controller 118, where the performance code identifies the actual operation of the core 104. The performance code could, for example, represent a measure of the propagation delay in the core 104. The output of the summer 122 could therefore represent a difference or error between the reference performance code (from the RCC table 120) and the actual performance code (from the HPM 124). The HPM 124 includes any suitable structure for monitoring the operation of a powered device. Details of example hardware performance monitors can be found in the following U.S. patents, which are hereby incorporated by reference: U.S. Pat. No. 7,581,120; U.S. Pat. No. 7,479,768; and U.S. Pat. No. 7,289,921.

The APC 118 further includes a controller 126 and a digital pulse width modulator (DPWM) 128. The controller 126 receives the output of the summer 122 and adjusts the generation of the supply voltage $V_{DD}$ accordingly. For example, since the output of the summer 122 could represent the error between the expected and actual performance of the core 104, the controller 126 can use this error to adjust the supply voltage $V_{DD}$ until the core 104 achieves the desired performance. When the supply voltage $V_{DD}$ needs to be adjusted, the controller 126 can adjust an output signal that is provided to the modulator 128, which causes the modulator 128 to adjust the PWM signal 119 sent to the driver 108. The controller 126 includes any suitable structure for controlling generation of a signal for controlling or adjusting a supply voltage. As a particular example, the controller 126 could represent a proportional-integral-derivative (PID) controller.

The modulator 128 receives the output of the controller 126 and generates the PWM signal 119. For example, the modulator 128 could generate a PWM signal 119 having a certain duty cycle. If the modulator 128 receives a signal indicating that the controller 126 wishes to increase or decrease the supply voltage $V_{DD}$, and the modulator 128 could increase or decrease the duty cycle of the PWM signal 119 accordingly. The modulator 128 includes any suitable structure for generating a modulated signal for adjusting a supply voltage.

In a typical AVS system, there would be components between the APC 118 and the driver 108, such as a slave power controller in the EMU 106. Also, a typical AVS system would sample the output of the HPM 124 at a very low rate, such as 1 kHz. This low rate was used because the typical AVS system was often used to control process, voltage, and temperature (PVT) variations only. A voltage regulator would then be used to control other aspects of the voltage generation. There would typically be multiple loops within the AVS system, such as a voltage regulation loop in the EMU and a performance regulation loop in the APC.

In some embodiments, the system 100 in FIG. 1 uses a single control loop to regulate performance (delay in a critical path) over all variations. Disturbances in the system 100 that can cause a change of delay include process variations (across different powered components 102), temperature variations, and voltage variations. Voltage variations could be low bandwidth in nature and could include age drift of a power supply, DC tolerance, and slow moving load or line changes. The single regulation loop AVS can also regulate high bandwidth voltage variations, such as load and line steps, load line characteristics, and mode changes. These characteristics may be a result of the single loop regulation, which regulates only delay (and thus may be referred to as a delay regulation loop). The bandwidth of the AVS loop can be made as high as typical power supply regulation loops, so the AVS loop may have the capability to regulate the same disturbances as the power supply regulation loop. With this capability, the AVS system can be reduced to a single regulation loop system in which voltage is no longer regulated and in which only the delay is regulated. This opens new possibilities to partition more of the control elements into the powered component 102.

The single regulation loop here can use various compensation schemes (such as type 2, type 3, or PID) to compensate for various power converter power stages. For example, the buck converter's inductor 114 and output capacitor 116 form a resonant double pole, and the equivalent series resistance (ESR) of the output capacitor 116 forms a high frequency zero. The delay regulation loop controller 126 can position poles and zeros within the same frequency range as the buck converter's components to stabilize the loop. This characteristic renders the traditional voltage regulation loop unnecessary or redundant.

Other loops may be used in conjunction with the single regulation loop controlling delay in order to provide other features, such as over-current or over-voltage protection or current sharing. However, these loops are auxiliary to the single regulation loop controlling delay and do not contribute to the regulation of the delay. For example, a current sharing loop may be used in a multi-phase buck converter to regulate the current in each phase (usually to make them equal). However, the current sharing loop may have no impact on the single regulation loop controlling delay.

In this particular embodiment, the powered system 100 includes a single regulation loop AVS system formed by the HPM 124, the APC 118, and components within the EMU 106. The RCC table 120 functions as the input to the AVS loop, and the loop regulates based on the feedback information from the HPM 124. Voltage references (often used by voltage regulators) may not be necessary in the powered system 100 of FIG. 1, which can help to avoid problems such as voltage reference inaccuracies. Moreover, the controller 126 can sample the output of the HPM 124 (via the summer 122) at a much higher rate, such as up to 100 kHz or more. This allows the controller 126 to regulate the supply voltage $V_{DD}$ on a cycle-by-cycle basis. It also allows the controller 126 to handle disruptions such as voltage transients or other fast events that occur at higher frequencies. In addition, the EMU 106 shown here could be a standard component, and reducing the number of loops can simplify design, manufacture, and approval of new powered components 102 that include the APC 118.

FIG. 2 illustrates a second example powered system 200 having a single regulation loop AVS system according to this Specification. The embodiment of the powered system 200 shown in FIG. 2 is for illustration only. Other embodiments of the powered system 200 could be used without departing from the scope of this Specification.

As shown in FIG. 2, the powered system 200 includes a powered component 202 with a core 204 that receives a supply voltage $V_{DD+}$ from an EMU 206. The supply voltage $V_{DD+}$ is referenced to a ground voltage $V_{DD-}$. High currents can be generated across parasitic resistances 207a-207b coupling the powered component 202 and the EMU 206.

In this example, the EMU 206 represents a multi-phase energy management unit. This means the EMU 206 can generate multiple signals of different phases, which could be useful in multi-phase power converters. To support this functionality, the EMU 206 includes multiple drivers 208a-208d, which drive different voltage generation circuits 209a-209d. The voltage generation circuits 209a-209d generate different voltage signals having different phases that collectively form the supply voltage $V_{DD+}$. Here, each voltage generation circuit 209a-209d includes two transistors 210-212 and an inductor 214. Also, the voltage generation circuits 209a-209d are coupled to a filter capacitor 216.

In FIG. 2, the powered component 202 includes an APC 218 with an RCC table 220 and a summer 222, which receives input from an HPM 224 in the core 204. The APC 218 also includes a second summer 225, a controller 226, a modulator 228, a phase controller 230, and protection circuitry 232. The summer 222 outputs a signal identifying an error between a reference performance code (from the RCC table 220) and an actual performance code (from the HPM 224). The output of the summer 222 is modified by the summer 225 as described below. The controller 226, such as a PID controller, uses the output of the summer 225 to determine how to adjust the generation of the supply voltage $V_{DD+}$, and the modulator 228 generates a signal containing the appropriate duty cycle.

The phase controller 230 uses the output of the modulator 228 to generate PWM signals 219a-219d for the drivers 208a-208d. The phase controller 230 could generate the PWM signals 219a-219d in any suitable manner. For example, the phase controller 230 could output the signal from the modulator 228 without any additional delay as the PWM signal 219a. The phase controller 230 could also delay the signal from the modulator 228 by three different amounts and output those delayed signals as the PWM signals 219b-219d. The phase controller 230 includes any suitable structure for controlling or adjusting the phases of PWM signals used to generate voltage signals.

The protection circuitry 232 implements various forms of protection for modifying the behavior of the APC 218. The protection circuitry 232 could, for example, provide over-voltage and over-current protection. The protection circuitry 232 could modify the signal input to the controller 226 via the summer 225 to adjust the operation of the AVS loop, or the protection circuitry 232 could interact with the modulator 228 or phase controller 230 to adjust the operation of the AVS loop. The protection circuitry 232 includes any suitable structure for modifying operation of an AVS system to protect one or more circuits from damage or other problems. One example embodiment of the protection circuitry 232 is shown in FIG. 3.

Although FIGS. 1 and 2 illustrate examples of powered systems 100 and 200 each having a single regulation loop AVS system, various changes may be made to FIGS. 1 and 2. For example, a powered system could be used to provide operating power to any suitable powered component(s). Also, the system 200 could include any number of phases. In addition, components shown in one powered system could be used in the other powered system, such as when the protection circuitry 232 is used in the system 100 of FIG. 1.

Figure 3:
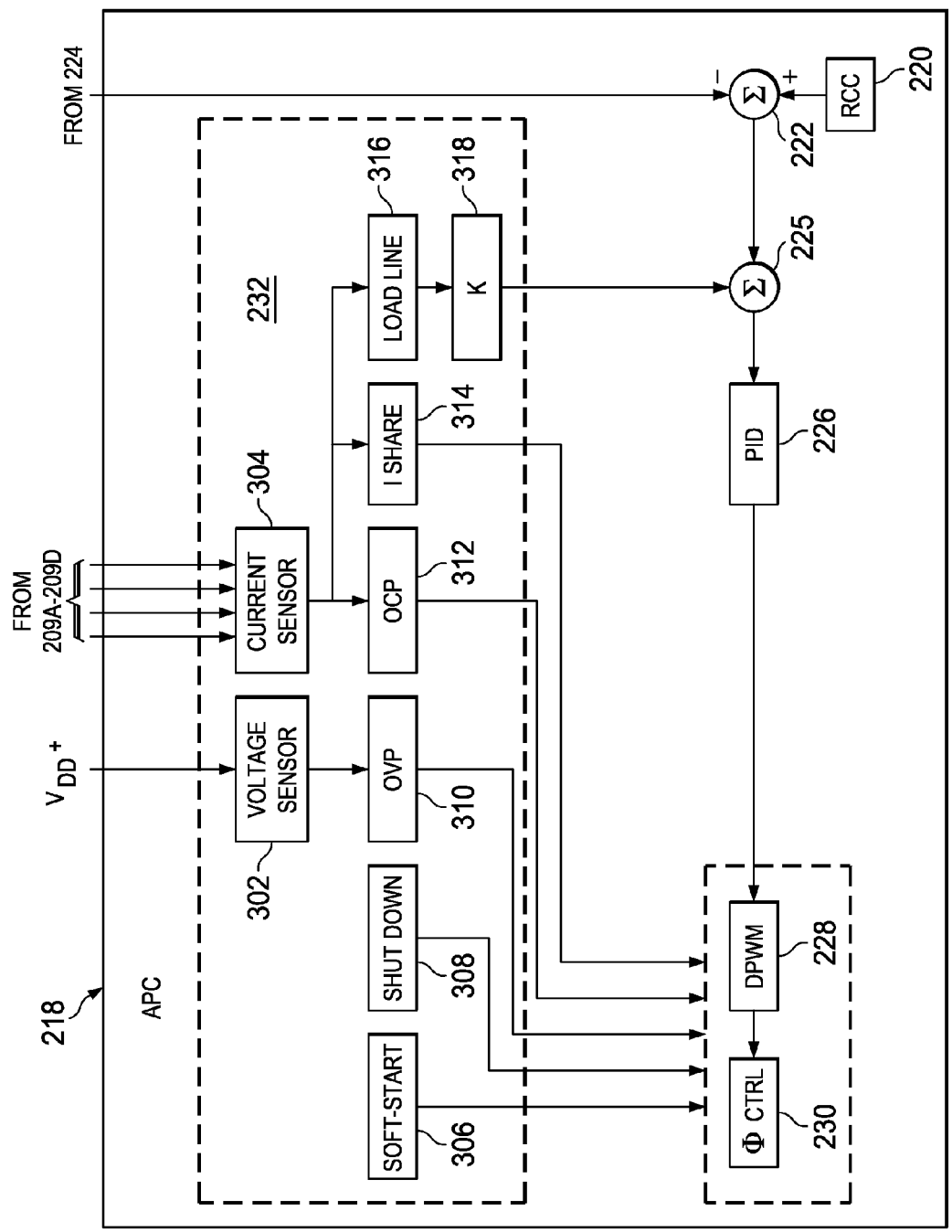
FIG. 3 illustrates an example advanced power controller (APC) in a single regulation loop AVS system according to this Specification.

FIG. 3 illustrates an example advanced power controller (APC) in a single regulation loop AVS system according to this Specification. More specifically, FIG. 3 illustrates one example embodiment of the APC 218 with protection circuitry 232 offering various forms of protection. The embodiments of the APC 218 and the protection circuitry 232 shown in FIG. 3 are for illustration only. Other embodiments of the APC 218 and the protection circuitry 232 could be used without departing from the scope of this Specification. For ease of explanation, the protection circuitry 232 in FIG. 3 is described as being used in the system 200 of FIG. 2, although the protection circuitry 232 could be used in other systems (such as in the system 100 of FIG. 1).

As shown in FIG. 3, the protection circuitry 232 includes a voltage sensor 302 and a current sensor 304. The voltage sensor 302 measures the supply voltage provided to a powered component, such as the supply voltage $V_{DD+}$ provided by the EMU 206. The voltage sensor 302 includes any suitable structure for measuring a voltage. The current sensor 304 measures the amount of current generated when providing the supply voltage to the powered component, such as the current generated in each of the voltage generation circuits 209a-209d. The current sensor 304 includes any suitable structure for measuring at least one current.

The protection circuitry 232 also includes various functional units 306-318 for modifying operation of the APC 218. For example, a soft-start unit 306 determines whether a powered component is operating in a soft-start mode. If so, the soft-start unit 306 could cause the APC 218 to generate PWM signals 219a-219d that force the supply voltage $V_{DD+}$ to rise until it reaches a steady-state voltage. This can be done to linearly or otherwise gradually increase the supply voltage $V_{DD+}$, rather than forcing the supply voltage $V_{DD+}$ to jump from a zero voltage to a much higher value. A shut-down unit 308 determines whether the powered component is shutting down and, if so, causes the APC 218 to generate PWM signals 219a-219d that stop generation of the supply voltage $V_{DD+}$.

An over-voltage protection unit 310 and an over-current protection unit 312 detect when the EMU 206 generates excessive voltage or current, either of which could damage the powered component. The over-voltage protection unit 310 includes any suitable structure for identifying excessive voltage, and the over-current protection unit 312 includes any suitable structure for identifying excessive current. A current share unit 314 helps balance the currents across the multiple phases used in the EMU 206 of FIG. 2, such as by balancing the currents generated by the voltage generation circuits 209a-209d. The current share unit 314 includes any suitable structure for balancing two or more currents.

A load line unit 316 supports load line regulation, which adjusts the supply voltage $V_{DD+}$ as a function of an output current (the current provided to the powered component 202). The load line unit 316 can receive an indication of the current measured by the current sensor 304 and output a voltage offset to be made to the supply voltage $V_{DD+}$. The voltage offset is converted by a gain unit 318 into a value suitable for combination with the output of the summer 222. For example, in some embodiments, the HPM 224 outputs values expressed as "tap points," where the tap points denote points between different pairs of sequentially-coupled delay cells. The gain unit 318 can convert the voltage offset output by the load line unit 316 into a value expressed as a tap point value. Note that other values could be used by the HPM 224 and the gain unit 318.

Each of the functional units 306-318 described above includes any suitable structure for performing the described function(s). Note that multiple physical loops may be present with the use of the protection circuitry 232 as shown in FIG. 3. For example, one physical loop includes the path from the voltage generation circuits 209a-209d to the current sensor 304, and another physical loop includes the path from the output of the EMU 206 to the voltage sensor 302. The third physical loop includes the HPM 224. However, many of these physical loops can be discontinuous and provide protection flags to the main, continuous single regulation loop AVS system used for regulation. Even if one or more of these other loops operates continuously, those loops are auxiliary to the main AVS regulation loop, which here includes a single loop that controls the supply voltage $V_{DD+}$ based on performance of the powered component 202 and not based on a voltage reference.

Although FIG. 3 illustrates one example of an APC in a single regulation loop AVS system, various changes may be made to FIG. 3. For example, any other or additional functional units could be used in the protection circuitry 232 to provide any other or additional types of protection.

FIG. 4 illustrates an example method 400 for powering a system using a single regulation loop AVS system according to this Specification. The embodiment of the method 400 shown in FIG. 4 is for illustration only. Other embodiments of the method 400 could be used without departing from the scope of this Specification.

As shown in FIG. 4, an output voltage is generated using a PWM signal at step 402. This could include, for example, generating an output voltage using the EMU 106 or 206. The EMU 106 or 206 generates the output voltage based on the PWM signal(s) 119, 219a-219d received from a powered component 102, 202. The output voltage is provided to the powered component at step 404.

An HPM signal is generated based on the performance of the powered component at step 406. This could include, for example, the HPM 124, 224 generating a performance code representing a measure of the propagation delay in the powered component. An additional PWM signal is generated using the HPM signal at step 408. This could include, for example, the APC 118, 218 generating a PWM signal having a duty cycle that increases or decreases the supply voltage being generated. The additional PWM signal can be modified to provide some type of protection at step 410. This could include, for example, modifying the PWM signal to protect from over-voltage, over-current, or current imbalance conditions. The process can then be repeated using the additional PWM signal.

Although FIG. 4 illustrates one example of a method 400 for powering a system using a single regulation loop AVS system, various changes may be made to FIG. 4. For example, while shown as a series of steps, various steps in FIG. 4 could overlap, occur in parallel, occur in a different order, or occur multiple times.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

The preceding Description of certain example embodiments and applications, and generally associated methods, illustrate the principles and features of the claimed invention. Other embodiments and applications, and various design choices, will be apparent to those skilled in the art from the Description, Figures and Claims of this Specification. Accordingly, the preceding Description does not define or limit the scope of the invention, which is defined by the following Claims.

What is claimed is:

1. A circuit for providing a regulated supply voltage to a powered component that performs digital operations comprising:
   a switching regulator configured to supply the regulated supply voltage to the powered component, including:
      at least one switching transistor; and
      driver circuitry configured to control pulse switching of the at least one switching transistor in response to a pulse switching control signal; and
   power controller circuitry integrated with the powered component, and configured to control the supply voltage supplied by the switching regulator, including hardware performance monitoring circuitry configured to generate a performance monitoring signal corresponding to a detected signal path delay associated with selected digital operations of the powered component relative to a reference performance level; and
pulse switching control circuitry configured to provide to the driver circuitry the pulse switching control signal based on the performance monitoring signal;
the hardware performance monitoring circuitry, the pulse switching control circuitry and the driver circuitry comprising a closed supply regulation loop configured to regulate the regulated supply voltage based on the performance monitoring signal generated by the performance monitoring circuitry.

2. The circuit of claim 1, wherein the powered component comprises:
a core configured to perform digital operations; and
signal path delay circuitry integrated into the core and configured to exhibit the signal path delay representative of a performance level of the core; and
the hardware performance monitoring circuitry is integrated into the core and configured to detect the signal path delay and generate a detected performance level signal; and
the performance monitoring circuitry is responsive to the detected performance level signal to generate the performance monitoring signal.

3. The circuit of claim 1, wherein the pulse switching control circuitry comprises:
pulse width modulation circuitry configured to generate the switching control signal based on the performance monitoring signal.

4. The circuit of claim 3, wherein the pulse width modulation circuitry includes controller circuitry configured to control the generation of the switching control signal in response to the performance monitoring signal, including stabilizing the operation of the switching regulator.

5. The circuit of claim 4, wherein the controller circuitry comprises a proportional-integral-derivative (PID) controller.

6. The circuit of claim 3, wherein:
the switching regulator is configured for a multi-phase operation in response to multi-phase pulse switching control signals; and
the pulse width modulation circuitry includes a phase controller configured to generate the multi-phase pulse switching control signals.

7. The circuit of claim 1, wherein:
the pulse switching control circuitry includes auxiliary control circuitry configured to provide one or more auxiliary control signals for controlling respective operations of the switching regulator;
the auxiliary control circuitry and the driver circuitry comprise an auxiliary control loop configured to control respective operations of the switching regulator based on the auxiliary control signals, the auxiliary control loop being auxiliary to the supply regulation loop; and
the pulse switching control circuitry is configured to provide the pulse switching control signal in response to the performance monitoring signal that controls the supply regulation loop and the one or more auxiliary control signals that control the auxiliary control loop.

8. A system comprising:
a powered component; and
a switching regulator configured to supply the regulated supply voltage to the powered component, including:
at least one switching transistor; and
driver circuitry configured to control pulse switching of the at least one switching transistor in response to a pulse switching control signal; and
power controller circuitry integrated with the powered component, and configured to control the supply voltage supplied by the switching regulator, including
hardware performance monitoring circuitry configured to generate a performance monitoring signal corresponding to a detected signal path delay associated with selected digital operations of the powered component relative to a reference performance level; and
pulse switching control circuitry configured to provide to the driver circuitry the pulse switching control signal based on the performance monitoring signal;
the hardware performance monitoring circuitry, the pulse switching control circuitry and the driver circuitry comprising a closed supply regulation loop configured to regulate the regulated supply voltage based on the performance monitoring signal generated by the performance monitoring circuitry.

9. The system of claim 8, wherein:
the powered component comprises:
a core configured to perform digital operations;
signal path delay circuitry integrated into the core and configured to exhibit the signal path delay representative of a performance level of the core; and
the hardware performance monitoring circuitry is integrated into the core and configured to detect the signal path delay and generate a detected performance level signal;
the performance monitoring circuitry is responsive to the detected performance level signal to generate the performance monitoring signal.

10. The system of claim 8, wherein the pulse switching control circuitry comprises:
pulse width modulation circuitry configured to generate the pulse switching control signal based on the performance monitoring signal.

11. The system of claim 10, wherein the pulse width modulation circuitry includes controller circuitry configured to control the generation of the pulse switching control signal in response to the performance monitoring signal, including stabilizing the operation of the switching regulator.

12. The system of claim 11, wherein the controller circuitry comprises a proportional-integral-derivative (PID) controller.

13. The system of claim 10, wherein:
the switching regulator is configured for a multi-phase operation in response to multi-phase pulse switching control signals; and
the pulse width modulation circuitry includes a phase controller configured to generate the multi-phase pulse switching control signals.

14. The system of claim 8, wherein:
the pulse switching control circuitry includes auxiliary control circuitry configured to provide one or more auxiliary control signals for controlling respective operations of the switching regulator;
the auxiliary control circuitry and the driver circuitry comprise an auxiliary control loop configured to control respective operations of the switching regulator based on the auxiliary control signals, the auxiliary control loop being auxiliary to the supply regulation loop; and
the pulse switching control circuitry is configured to provide the pulse switching control signal in response to the performance monitoring signal that controls the supply regulation loop and the one or more auxiliary control signals that control the auxiliary control loop.

15. A powered component receiving a regulated supply voltage from a switching regulator that includes at least one reactive energy storage element and at least one switching transistor responsive to a switching control signal to control the at least one reactive energy storage element to provide the regulated supply voltage, the powered component comprising:
    core circuitry performing digital operations;
    driver circuitry configured to control pulse switching of the at least one switching transistor in response to a pulse switching control signal; and
    power controller circuitry configured to control the supply voltage supplied by the switching regulator, including
        pulse switching control circuitry configured to provide to the driver circuitry the pulse switching control signal based on a performance monitoring signal; and
        hardware performance monitoring circuitry configured to generate the performance monitoring signal corresponding to a detected signal path delay associated with selected digital operations of the core circuitry relative to a reference performance level
    the hardware performance monitoring circuitry, the pulse switching control circuitry and the driver circuitry comprising a closed supply regulation loop configured to regulate the regulated supply voltage based on the performance monitoring signal generated by the performance monitoring circuitry.

16. The circuit of claim 15, wherein the pulse switching control circuitry comprises:
    pulse width modulation circuitry configured to generate the pulse switching control signal based on the performance monitoring signal.

17. The circuit of claim 15, wherein:
    the pulse switching control circuitry includes auxiliary control circuitry configured to provide one or more auxiliary control signals for controlling respective operations of the switching regulator;
    the auxiliary control circuitry and the driver circuitry comprise an auxiliary control loop configured to control respective operations of the switching regulator based on the auxiliary control signals, the auxiliary control loop being auxiliary to the supply regulation loop; and
    the pulse switching control circuitry is configured to provide the pulse switching control signal in response to the performance monitoring signal that controls the supply regulation loop and the one or more auxiliary control signals that control the auxiliary control loop.

* * * * *